H. J. CASE.
Harvester Rake.

No. 86,904.

2 Sheets—Sheet 1.

Patented Feb. 16, 1869.

H. J. CASE.
Harvester Rake.

No. 86,904.

2 Sheets—Sheet 2.

Patented Feb. 16, 1869.

Witnesses:

Inventor:

UNITED STATES PATENT OFFICE.

HENRY J. CASE, OF AUBURN, NEW YORK, ASSIGNOR TO HIMSELF, WILLIAM H. STEVENSON, AND SMITH D. WACKMAN, OF THE SAME PLACE.

IMPROVEMENT IN HARVESTER-RAKES.

Specification forming part of Letters Patent No. 86,904, dated February 16, 1869.

*To all whom it may concern:*

Be it known that I, HENRY J. CASE, of Auburn, in the county of Cayuga and State of New York, have invented certain new and useful Improvements in Harvesters, of which the following is a full, clear, and exact description, reference being had to the accompanying drawings, which make part of this specification, and in which—

Figure 1:
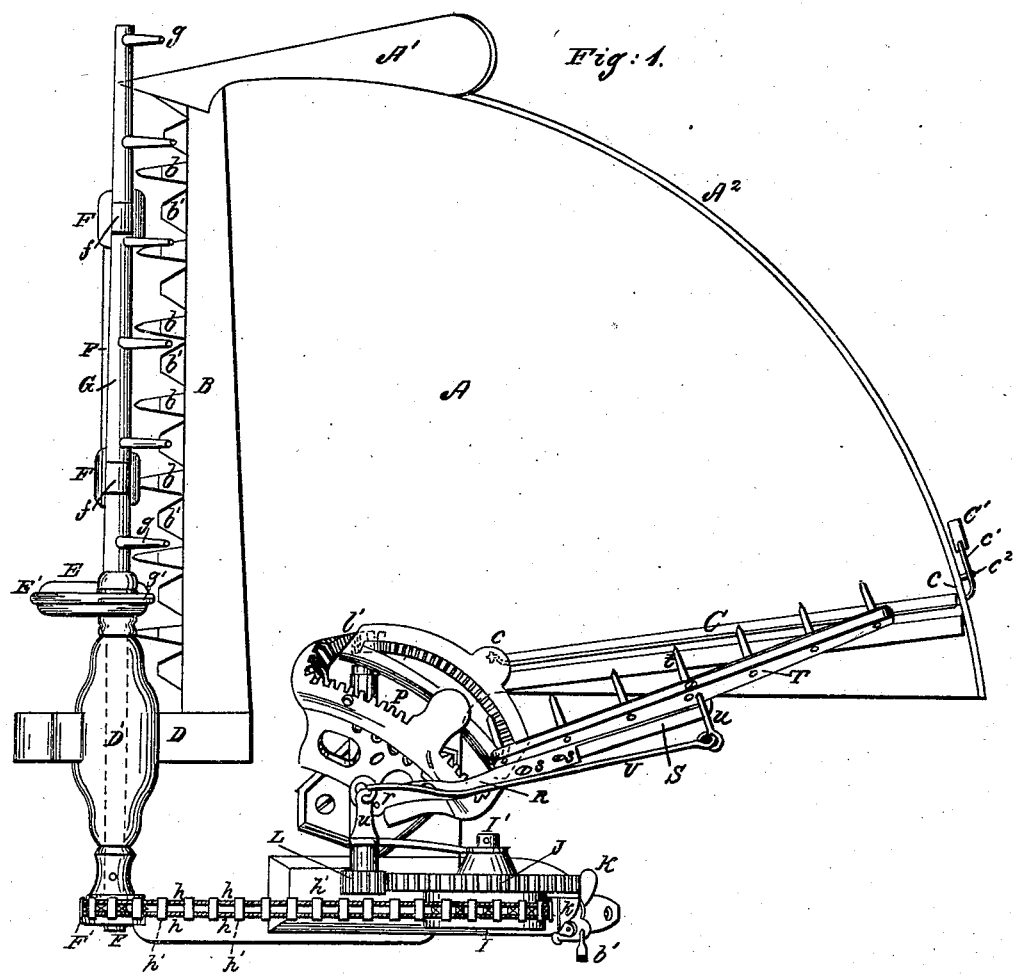
Figure 2:
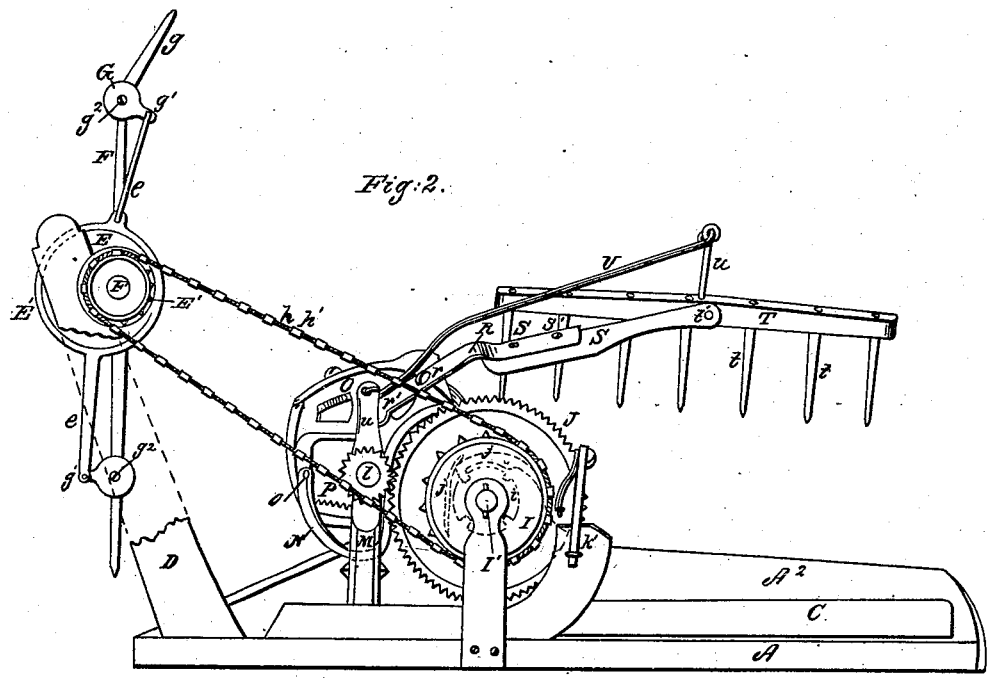
Figure 3:
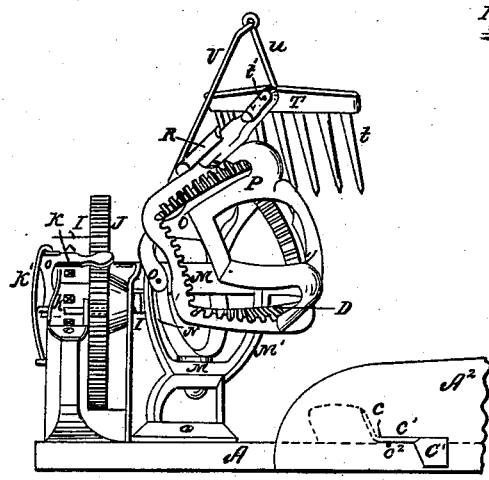
Figure 4:

Figure 1 represents a plan or top view of so much of a harvester to which my improvements are applied as is necessary to illustrate my invention. The blue lines in this figure show the position of the valve-board when depressed by the passage of the rake, and the red line indicates the point at which the platform may be cut off. Fig. 2 represents a view, in elevation, of the same as seen from the gearing side. Fig. 3 represents a similar view of the same as seen from the rear. Fig. 4 represents a vertical longitudinal central section through the rake-arm and socket.

In cutting grain or grass on hill-sides, when the divider end of the platform is highest, the grain has a tendency to slide off on the gearing side, thus causing the grain to straggle.

The object of the first part of my invention is to prevent the grain from sliding from the platform of a harvester (when the platform is inclined by its divider end being higher than the other) before being removed by the rake; and the improvement herein claimed consists in a novel method of combining, in a harvester, a solid platform to receive the cut grain; a counterbalanced valve-board, pivoted at its lower side upon the platform near its delivery-edge, and which yields when the rake passes over it, and rises, to act as a fence, after the rake has passed, and a vibrating sweep-rake, moving over the platform in a circular path in front of the valve-board, sweeping the grain over the valve-board in its backward movement, and discharging it behind the pivot of the rake.

My invention further consists in a novel method of combining, with the platform of a harvester, an oscillating valve-board, which, when erect, forms a stop to compact the gavel and prevent it from sliding from the stubble side of the platform before being swept off by the rake, and which, when depressed for the discharge of the gavel, forms an extension of the platform, whereby I am enabled to discharge the grain farther from the standing grain than by the ordinary way.

My invention further consists in a novel method of combining, in a harvester, a reel to press the standing grain back upon the cutters; a platform, upon which the cut grain is swept by the reel after being cut; an oscillating valve board or fence, pivoted on the platform near its delivery-edge, to prevent the grain sliding off the platform, and a rake, mounted on and moving over the platform in such manner as to take the grain swept back by the reel, sweep it backward over the valve-board, and discharge it behind the rake.

The next part of my invention relates to devices for pressing the grain back against the cutters to be severed, and then to sweep it back from the cutting apparatus either directly upon the ground, as in mowing, where no platform is used, or upon the platform, as in reaping.

My invention for attaining these results consists in a novel method of combining, with a reel, toothed ribs or beaters having a motion of rotation around the reel-axis, and also a positive oscillating movement on their own axes, the latter movement being imparted to them by means of an eccentric on the reel-shaft, cranks on the beater-shafts, and pitman-rods connecting the eccentrics and cranks, whereby the teeth enter the grain in advance of the cutters, with their points inclined downward and at a tangent to the reel-axis, assume a vertical position, or one radial to the reel-axis, when passing over the finger-beam, and then rise out of the grain with their points inclined downward and backward, to allow the grain to free itself from the teeth.

My invention further consists in a novel method of constructing an overhung reel with toothed beaters or ribs having an oscillating motion around their axes.

My invention further consists in a novel method of regulating the angle of the teeth on the reel-ribs relative to a radial line passing through the reel-axis; and this I do by adjusting the cranks on the ribs relatively to the eccentric on the axle.

The next part of my invention relates to a device for driving a reel or rake; and my improvement consists in a novel method of constructing a driving band or chain by combining two cords of fibrous material with metal clamps, connecting them at proper intervals, so as to leave spaces for the teeth of the sprocket-wheels to enter, by which mode of construction a simple, strong, cheap, and effective chain is secured.

The next part of my invention relates to the rake; and consists in a novel method of combining, in a harvester, a rake traversing the platform in a circular path, a stationary driving-shaft, and an oscillating internally-geared rack, turning on a vertical pivot below the shaft and a horizontal pivot in the same plane as the shaft.

My invention further consists in a novel method of combining, with a stationary driving-shaft, a rack and a rake, describing a circular path over the platform, and supported in bearings embracing the stationary axle.

My invention further consists in a novel method of adjusting the angle of inclination of the arm that carries the rake-head by means of a socket, in which the rake-arm is inserted, having a transverse rib and a set-screw or bolt on each side thereof to clamp the arm in the socket.

My invention further consists in a novel method of combining the pulley which drives the reel with the gear-wheel which actuates the rake, so that the reel may run without the rake, or both may work together; and this I accomplish by mounting the gear-wheel loosely on the reel-driving shaft, and pivoting on its face a dog actuated by a spring, which throws the hook of the dog into one of a series of notches on a small wheel turning on the reel-driving shaft, and thus locks the gear and pulley together.

My invention further consists in a novel method of combining, with an automatic rake driven by gearing and carrying an automatic clutching device, a stop or detent, which not only arrests the rake at the proper moment after discharging the gavel, but locks it in that position.

My invention further consists in combining, with an automatic rake driven by gearing and carrying an automatic clutching device and a stop which automatically arrests the rake at the end of the stroke and holds it there, a disconnecting apparatus, controlled by the driver, whereby he is enabled to hold the rake out of gear as long as desired, and thus to regulate the size of the gavels.

The accompanying drawings show so much of a machine only as is necessary to illustrate my invention. In practice, however, my improvements are to be used with a fully-organized machine of approved construction. The drawings also show all my improvements embodied in one machine for joint operation, but many of them, it is obvious, may be advantageously used without the others. My improvements may also readily be adapted to either one or two wheeled machines having rigid or hinged finger-beams either in front or in rear of the driving-wheels.

In this instance my improvements are shown as applied to a harvester having a sector-shaped or quadrant platform, A, attached to the finger-beam B in any proper well-known way. The finger-beam is provided with guards $b$ and cutters $b'$ of ordinary construction, operated in the usual way. A deflecting-board, $A^1$, on the divider end of the finger-beam separates the cut from the uncut grain, and a fence or guard, $A^2$, prevents the grain from escaping from the grain-side of the platform.

I find that when the divider end of the platform is highest the jolting of the machine causes the cut stalks to slide off the stubble side of the platform before the rake comes round, and thus makes straggling gavels. To prevent this I arrange a valve or gate, C, across the discharge side of the platform, and pivot it, at its lower edge, in bearings $c$ in such manner that, while free to fold backward to allow the rake and gavel to pass over it, it will not fold forward beyond a vertical line.

In order to restore the valve to its upright position after the passage of the gavel I attach a weight, C', to a crank, $c^1$, rigidly secured to and projecting at right angles from the board. A stop, $c^2$, limits the descent of the weight.

I prefer this arrangement, as the board is thereby held steadily in an upright position; but it would answer a good purpose to let the crank and weight hang vertically from the valve like a pendulum, or the tripping device might be applied at the end next the rake. A spring might also be substituted for the weight under some conditions, or even devices operated by the driver from his seat on the machine. The valve-board may also be so arranged that, when folded down, it shall project over the edge of the platform, as shown in red and blue lines in Fig. 1, where the red line indicates the rear edge of the platform and the blue lines the valve-board.

I mount a post, D, on the main frame, the platform, or over the heel end of the finger-beam, as may be best adapted to the particular class of machines to which my improvements may be applied. In this instance the post is inclined slightly forward, so as to bring the reel-shaft slightly in advance of the cutters.

The reel-shaft F is mounted in bearings in a collar or bracket, D', secured upon the reel-post. An eccentric, E, is secured upon the inner end of the collar D'. The reel is provided with arms having bearings $f$ at their ends, in which ribs or beaters G are provided to rock freely axially. These arms are provided with teeth $g$.

An eccentric-strap, E', on the eccentric E, is connected by link-rods $e$ with cranks $g^1$ on the inner ends of the ribs G. One rod is rigidly connected with the strap, while the other is jointed.

The cranks are attached to the beaters by screws $g^2$, or other equivalent adjusting device, in order at pleasure to vary the relation of the teeth to the platform at any given point of their stroke. The teeth should generally be vertical when pressing the grain back upon the cutters, as shown in Fig. 2. The reel is supported at the stubble end only. I have shown two beaters only in the drawings, but it is obvious that four may be used if required. The teeth $g$ are arranged irregularly upon the beaters in order that they may successively pass over every part of the cutting apparatus, and not have each tooth follow in the same track as its predecessor. I am also enabled by this device to use a smaller number of teeth than would otherwise be required. The reel is, in this instance, driven from a sprocket-pulley on a driving-shaft by a chain encircling a corresponding pulley, F', on the reel-shaft. This chain is composed of two parallel cords, $h$, of fibrous material, united by metal clips $h'$, simply folded upon the cords, and clamped by a blow from a hammer, thus forming a cheap but effective chain.

The sprocket-wheel I is mounted on and revolves with a shaft, I', driven by any proper and well-known arrangement of gearing from the main driving-wheels. A flanged collar, $i$, (shown in dotted lines in Fig. 2,) is secured on the shaft I. The gear-wheel J, which drives the raking mechanism, runs loosely on this collar. In order to throw the raking-mechanism into gear I pivot a lever or dog, $j$, on the inner face of the wheel J in such manner that its hooked end may when released be thrown by a spring, $j'$, into one of a series of notches in the flange of the collar $i$. The other end of this dog extends to the flange of the gear-wheel. A bent lever, K, is pivoted on the frame, its horizontal arm forming a handle or treadle, while a stop-pin, $k$, is attached to the lower end. A spring, $k'$, keeps this pin constantly pressed against the side of the wheel J. The parts are so arranged that at the end of the stroke of the rake it rises from the platform just at the moment the dog assumes the position shown in Fig. 2. The pin $k$ releases the dog from the notch of the collar, thereby disconnecting the gear-wheel J from the shaft I', and thus stopping the rake. At the same instant the pin $k$ is thrown by its spring $k'$ into a hole in the wheel J, thus locking it, and consequently the rake, firmly in that position. The withdrawal of the pin $k$ from the wheel J releases the dog $j$, which enters the notch in the collar, and thus throws the rake into gear again.

The wheel J drives a spur-pinion, L, on a shaft, $l$, rotating in a pipe-box or bearing, M, rigidly secured in an open frame, M'. A forked support, N, is pivoted to oscillate on a vertical axis beneath this shaft $l$ and between the arms of the frame M'.

At or about the level of the shaft an overhanging bracket, O, is pivoted, on horizontal axes $o$, to the arms of the support N, so as to allow it to rock vertically. This bracket supports an internally-geared rack, P, which oscillates on the bearings above described, and is driven by a pinion, $l'$, Fig. 1, on the outer end of the shaft $l$.

A socket, R, is pivoted to the oscillating rack at $r$, and may be adjusted backward or forward by means of a series of holes in the socket, arranged in the arc of a circle around the fulcrum $r$, in which holes a bolt, $r'$, enters. By this device the rake can be set nearer to or farther from the finger-beam, as hereinafter explained. The arm S, which carries the rake, is secured in this socket by two screws or bolts, $s\ s^1$. In order to vary the vertical inclination of this arm I form a transverse rib or projection, $s^2$, (shown in Fig. 4,) on the inner side of the socket. The arm S rocks on this projection, and its inclination is varied by tightening one screw and releasing the other.

The rake-head T is provided with teeth $t$, and is pivoted at its center to rock vertically on an axis, $t'$, on the rake-arm. An arm, $u$, attached to and extending above the rake-head, is connected by a link-rod, U, to an arm, $u'$, on the frame M. This device serves to keep the rake-head level, but, being well known, need not be particularly described here.

In operation, as the machine advances, the teeth $g$ revolve around the reel-shaft, and also are rocked or oscillated in their bearings $f$ by means of the cranks $g^1$, connecting-rods $e$, and eccentric E. The cranks are so adjusted that, as the teeth descend into the grain, they incline slightly downward and forward at an angle to the reel-arms, thus pressing the standing crop backward and downward against the cutters, which sever the stalks.

When passing over the cutters, I prefer to have the teeth vertical, as shown in Fig. 2. They remain in this position until they have passed back of the finger-beam, when they gradually incline backward with their points downward until clear of the grain. I am thus enabled to let the teeth run close to the cutter to clear away the stalks and to cause them to rise rapidly out of the way of the cut stalks on the platform. This reel would of itself form an efficient rake when a very narrow platform or a finger-beam without a platform was used.

When a gavel of proper size has accumulated on the platform, the rake is thrown into gear and sweeps it from the platform. The valve-board C, which has heretofore remained erect and prevented the grain from falling off, is now folded back by the passage of the rake and gavel over it; but, as soon as the gavel is discharged, the weight C' raises it again.

The moment the rake reaches the point it is shown as occupying in the drawings the pin $k$ slips into the hole in the gear-wheel J, as before described, and thus not only throws the rake out of gear, but locks it and the pinion until released by the driver, the reel continuing to run as usual. By this means I economize power, regulate the gavels, and prevent the rake from dropping or the gear from backing when disconnected.

I have described the ribs as furnished with teeth, but a board might be used instead of teeth, and yet answer a good purpose.

What I claim as my invention, and desire to secure by Letters Patent, is—

1. The combination of the solid platform, the counterbalanced oscillating valve-board pivoted on the platform, near its delivery-edge, and behind the rake, and the vibrating sweep-rake, moving over both the platform and valve-board in a circular path, and in different planes, on its forward and backward movement, as set forth, whereby the gavel is discharged behind the rake.

2. The arrangement of a counterbalanced oscillating valve-board on the stubble side of the platform of a harvester, so as to form an extension thereof when depressed and a fence or guard when erect, substantially as set forth.

3. The combination of the platform, the reel, the rake, and the oscillating valve-board, the combination being and operating substantially as set forth, for the purposes specified.

4. The combination, substantially as set forth, of oscillating reel-ribs with cranks, connecting-rods, and an eccentric on the reel-axis, for the purposes described.

5. The combination, substantially as set forth, of an overhung reel-shaft, with oscillating toothed reel-ribs.

6. Adjusting the teeth on the reel-ribs so as to vary their angle of inclination relatively to a radial line passing through the reel-axis by means of the cranks $g^1$ and screws $g^2$, as set forth.

7. A driving-band composed of two parallel cords of fibrous material, with metal clamps connecting them at intervals, substantially as set forth.

8. The combination, substantially as set forth, of the vibrating rake, the stationary driving-shaft, and the vertically-geared traversing rack, oscillating on both a vertical and a horizontal axis, for the purpose specified.

9. The combination, substantially as set forth, of the stationary driving-shaft, the oscillating traversing rack, and the rake, supported in swiveling bearings embracing the driving-shaft.

10. Adjusting the angle of inclination of the rake-arm by means of the central transverse rib $s^2$ in the socket and the set-screws on each side thereof, as described.

11. The combination, substantially as set forth, of the sprocket-wheel I, fixed on its shaft, with the gear-wheel, loose on its shaft, the notched flanged collar $i$, and the clutching mechanism for coupling the reel and rake driving mechanism together.

12. The arrangement of the spring-pin $k$, as described, whereby the rake is not only thrown out of gear after the discharge of the gavel, but locked and held in an elevated position.

13. The combination, substantially as set forth, of the sprocket-wheel I, gear-wheel J, and their clutching apparatus with the spring-pin $k$ and elbow-lever K, whereby the driver not only regulates the size of the gavels, but throws the rake into gear simultaneously with the withdrawal of the locking-pin.

In testimony whereof I have hereunto subscribed my name.

HENRY J. CASE.

Witnesses:
   HORACE T. COOK,
   B. B. SNOW.